(12) United States Patent
Spitznagle et al.

(10) Patent No.: US 10,318,097 B2
(45) Date of Patent: Jun. 11, 2019

(54) BASS MANAGEMENT FOR HOME THEATER SPEAKER SYSTEM AND HUB

(71) Applicant: Klipsch Group, Inc., Indianapolis, IN (US)

(72) Inventors: Matthew S. Spitznagle, Indianapolis, IN (US); Christopher J. Perrins, Indianapolis, IN (US)

(73) Assignee: Klipsch Group, Inc., Indianapolis, IN (US)

( * ) Notice: Subject to any disclaimer, the term of this patent is extended or adjusted under 35 U.S.C. 154(b) by 0 days.

(21) Appl. No.: 15/272,659

(22) Filed: Sep. 22, 2016

(65) Prior Publication Data

US 2017/0099558 A1 Apr. 6, 2017

Related U.S. Application Data

(60) Provisional application No. 62/221,710, filed on Sep. 22, 2015.

(51) Int. Cl.
| | |
|---|---|
| G06F 3/16 | (2006.01) |
| H04R 3/14 | (2006.01) |
| H04R 5/02 | (2006.01) |
| H04R 5/04 | (2006.01) |
| H04S 7/00 | (2006.01) |
| G06F 3/0481 | (2013.01) |

(52) U.S. Cl.
CPC ............ *G06F 3/0481* (2013.01); *G06F 3/165* (2013.01); *H04R 3/14* (2013.01); *H04R 5/02* (2013.01);
(Continued)

(58) Field of Classification Search
CPC .. H04R 2420/07; H04R 1/028; H04R 29/008; H04R 2201/40; H04R 2430/01; H04R 29/005; H04R 5/02; H04R 1/026; H04R 2201/028; H04R 2420/09; H04R 29/001; H04R 5/04; H04R 1/023; H04R 1/025; H04R 1/1016; H04R 1/1025; H04M 1/0256; H04M 1/72527; H04M 1/21;
(Continued)

(56) References Cited

U.S. PATENT DOCUMENTS 6,487,296 B1 * 11/2002 Allen ...................... H04H 20/89
381/80
6,684,060 B1 1/2004 Curtin
(Continued)

FOREIGN PATENT DOCUMENTS

EP 0784386 7/1997

OTHER PUBLICATIONS

Phillips Semiconductors, I2S bus specification, Feb. 1986, revised Jun. 5, 1996.

*Primary Examiner* — Lun-See Lao
(74) *Attorney, Agent, or Firm* — Indiano & McConnell LLC

(57) ABSTRACT

An audio system is disclosed that contains speakers that are configured to transmit unique parameters to an audio source. The system includes a hub that is configured to be connected with one or more audio sources. At least one speaker is included having one or more filter parameters stored internally that are specific to the speaker. The speaker is operable to transmit the one or more filter parameters to the hub. The hub is operable to use the one or more filter parameters to filter an audio channel associated with the speaker and an associated subwoofer channel.

14 Claims, 12 Drawing Sheets

(52) U.S. Cl.
CPC ............. *H04R 5/04* (2013.01); *H04S 7/307*
(2013.01); *H04R 2205/024* (2013.01); *H04R 2420/05* (2013.01); *H04R 2420/07* (2013.01); *H04S 2400/03* (2013.01); *H04S 2400/07* (2013.01)

(58) Field of Classification Search
CPC ......... H04W 12/06; H04W 4/02; H04W 4/18; H04W 4/20; H04W 84/14; H04W 16/26; H04W 16/32; H04W 88/085; H04N 5/23212; H04N 21/4333; H04N 21/4722
USPC ............. 381/307, 311, 56–59, 1–4, 77, 80; 700/94
See application file for complete search history.

(56) References Cited

U.S. PATENT DOCUMENTS

| | | | |
|---|---|---|---|
| 7,840,983 B1* | 11/2010 | Feldman | H04N 7/18 725/78 |
| 9,554,061 B1* | 1/2017 | Proctor, Jr. | H04N 5/268 |
| 2002/0072816 A1* | 6/2002 | Shdema | H04L 12/2805 700/94 |
| 2004/0223622 A1 | 11/2004 | Lindemann et al. | |
| 2012/0114151 A1 | 5/2012 | Nguyen et al. | |
| 2012/0148075 A1 | 6/2012 | Goh et al. | |
| 2013/0324031 A1 | 12/2013 | Loureiro | |
| 2015/0163616 A1 | 6/2015 | Chatterjee | |
| 2015/0208188 A1 | 7/2015 | Carlsson et al. | |

\* cited by examiner

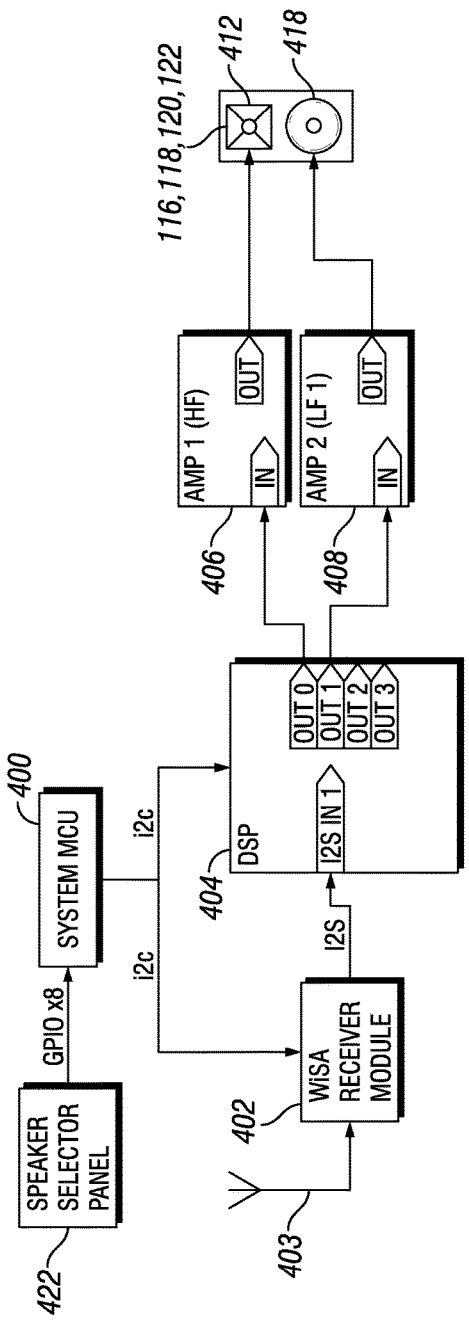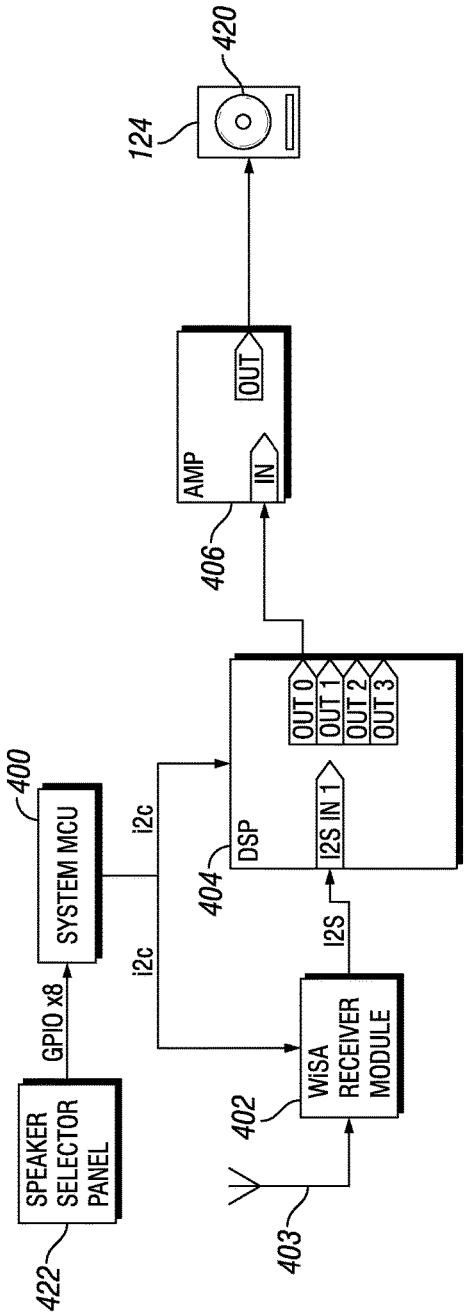

_US 10,318,097 B2_

BASS MANAGEMENT FOR HOME THEATER SPEAKER SYSTEM AND HUB

CROSS REFERENCE TO RELATED APPLICATION

The present application claims priority to and the benefit of U.S. provisional application No. 62/221,710 filed on Sep. 22, 2015.

INTRODUCTION

Home cinema, also commonly called home theater, generally refers to home entertainment systems that have the goal of reproducing movie theater experiences using video and audio equipment in the home or at other venues. Beginning in the late 1990s, and continuing through much of the 2000s, home-theater technology progressed with the development of the DVD-Video format, Dolby Digital 5.1-channel audio ("surround sound"), and large screen high definition televisions. In the 2010s, 3D televisions and Blu-ray Disc technology have ushered in a new era of home theater.

Modern home theater designs typically require a television set or video projector, which is typically a flat screen television (SDTV, HDTV, or 3D TV) or high-definition video projector. The systems also include video and audio input devices. These devices are typically capable of outputting audio and video signals in high resolution formats such as Blu-ray discs, cable box receivers, satellite receivers, video game consoles, and so forth. The systems typically have an audio processing device that receive the signals from the input devices. Input devices are processed by either standalone AV receivers or preamplifiers. These devices include a sound processor for processing complex surround sound formats such as Dolby Pro-Logic, Pro-Logic II, X, and Z, Dolby Digital, DTS, Dolby Digital EX, DTS-ES, Dolby Digital Plus, Dolby TrueHD and DTS-HD Master Audio to name a few. Finally, the systems typically include audio output components that consist of at two speakers, for stereo sound, however most systems have a 5.1 surround sound system, which has a left and right front speaker, center speaker, left and right rear speakers and a subwoofer. Other systems include a 7.1 surround sound system that adds two additional speakers to the conventional 5.1 surround sound system configuration. One aspect of the present invention discloses a wireless speaker system that is easily setup by the user.

The goal of any well-designed speaker system is to have smooth transitions between the various components in the system. For traditional box speakers, the division of frequencies is handled by an internal crossover entirely under the control of the acoustic engineer.

Achieving good transitions between multiple speakers becomes much more complex when elements are brought together especially when those speakers are not produced by the same designer. Current audio-video receivers ("AVRs") took some first steps to address this but there are some elements missing to create good bass summation.

THX outlined the following requirements for speakers bearing their approval:
The main speakers must have an 80 Hz, $2^{nd}$ order, Butterworth high-pass characteristic.
The subwoofers must be flat to no less than 250 Hz.
An active crossover must be used to manage the bass transition from the mains to the subwoofers.

Using these requirements, the crossover between the main speakers and the subwoofer became standard: use a Second-order, Butterworth high-pass filter on the main speakers and a corresponding Linkwitz-Riley fourth-order low-pass on the subwoofer. Combined with the high-pass acoustics on the main speakers, this forms a fourth-order Linkwitz-Riley crossover, a widely accepted filter set that produces a flat summation and requires no phase inversions. In an ideal case, this system provides excellent summation.

What is missing in the THX case is most speakers do not have a 70 Hz high-pass frequency. Current AVRs attempt to compensate by making the crossover frequency for each speaker independently adjustable. This addresses the variations in high-pass frequencies but does not address the variations in the main speakers' high-pass response.

A 12 db/octave, Q=0.707 high-pass speaker response is needed to make this work properly. A speaker's high-pass response may vary anywhere from 6 dB/octave to over 24 dB/octave. The Q may also vary greatly. There is also the issue that almost no speaker manufacturers provide the high-pass characteristic or recommended crossover frequency for their speakers. This lack of information makes it highly unlikely that a typical user will be able to create a proper bass crossover between the main speaker and subwoofer. One aspect of the present invention addresses this issue.

BRIEF DESCRIPTION OF THE DRAWINGS

FIG. 10c is a circuit diagram for a representative surround speaker.
FIG. 10d is a circuit diagram for a representative subwoofer.

DETAILED DESCRIPTION OF REPRESENTATIVE EMBODIMENTS

Figure 1:
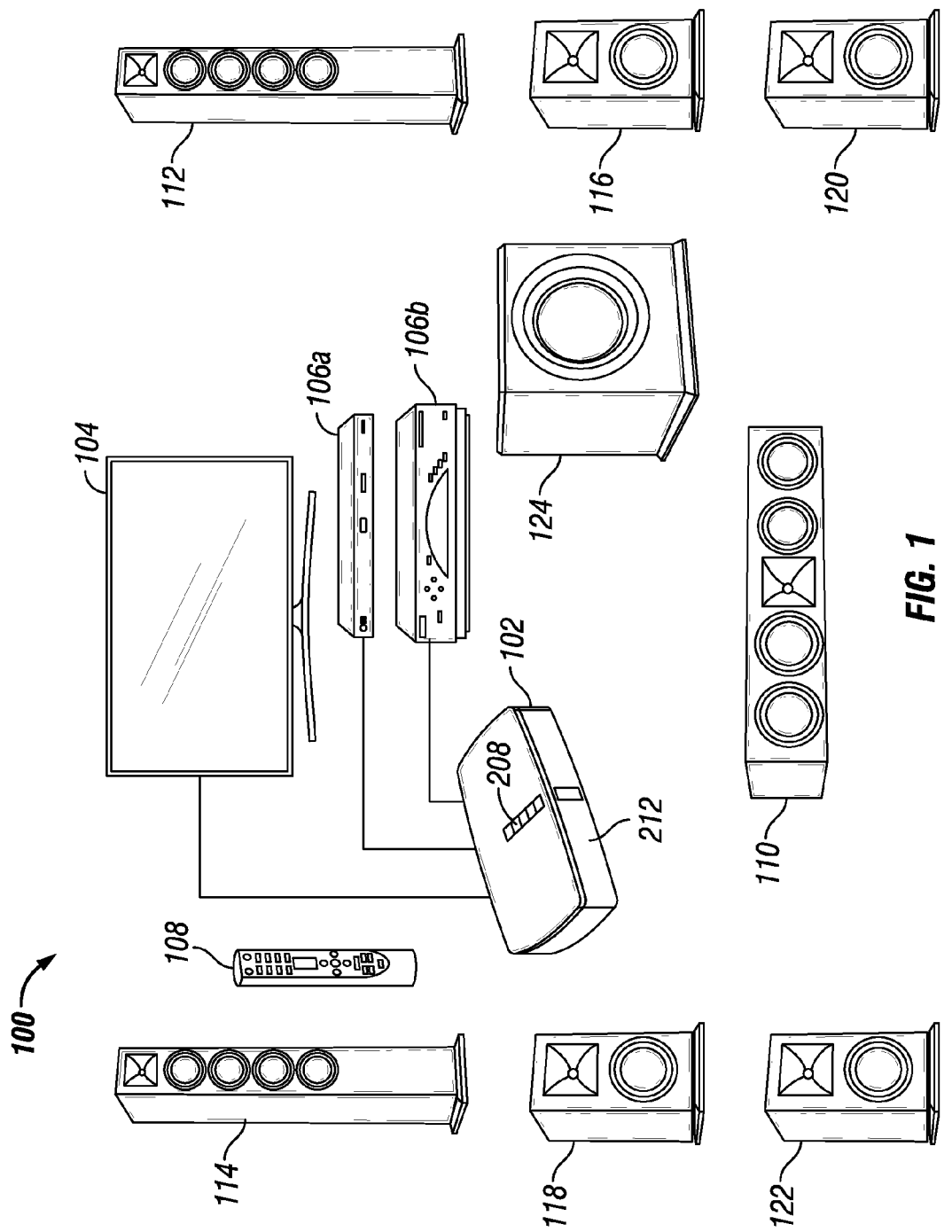
FIG. 1 is a diagram of several components found in a home theater system.

For the purpose of promoting an understanding of the principles of the invention, reference is now made to the embodiments illustrated in the drawings and specific language is used to describe the same. No limitation of the scope of the invention is intended. Alterations and modifications to the illustrated devices, and other applications of the principles of the invention as illustrated herein are contemplated as would normally occur to one skilled in the art to which the invention relates.

Referring to FIG. 1, a representative home theater system 100 is disclosed that includes several electronic components. The system 100 includes a high definition control center or hub 102, a video display device 104 such as a flat screen television for example, and one or more input devices 106a, 106b such as a cable box, satellite receiver, or Blu-ray player (for example). Although other components may include a remote control, as will be described in more detail below, the hub 102 includes a remote control 108 that allows a user to setup, configure, and control the hub 102. As illustrated, an output from the input devices 106a, 106b is connected with one or more inputs on the hub 102 thereby transferring audio and video signals to the hub 102. An output from the hub 102 is connected with the video display device 104. These connections could be made by HDMI cables, digital audio cables, optical audio cables and so forth.

In the preferred form, the hub 102 is configured to control up to eight speakers in a 7.1 surround sound speaker system, however, as discussed in more detail below, the hub 102 could actually provide audio signals to many more speakers. Although a 7.1 surround sound speaker system is illustrated, it should be appreciated that other configurations exist and could be deployed in the system 100 disclosed herein such as 5.1 surround sound speaker system, 3 speakers, 2 speakers and so forth. The hub 102 is configured to operate in numerous settings and as a result, one skilled in the art should appreciate that even though 7.1 surround sound speaker system is depicted, it should not be construed as a limitation of the present invention absent claims directed to such a specific system.

In one illustrative form, the system 100 includes a center channel wireless speaker 110, a front right channel wireless speaker 112, a front left channel wireless speaker 114, a side right channel wireless speaker 116, a side left channel wireless speaker 118, a rear right channel wireless speaker 120, a rear left channel wireless speaker 122, and a wireless subwoofer 124. The name 7.1 surround sound is the common name for an eight-channel surround audio system commonly used in home theater configurations. It adds two additional speakers to the more conventional six-channel (5.1) audio configuration. As set forth in greater detail below, in the preferred form, the wireless speakers 110-122 are wireless speakers that are configured and operable to send data to the hub 102 and receive data from the hub 102. The wireless speakers 110-122 can also receive audio data from the hub 102 to reproduce audio sound.

In other forms, the hub 102 is configured to function with Dolby Atmos® speaker setups. These configurations are labelled as 7.1.4 surround sound, for example. In this configuration, the first digit [7] refers to the number of traditional surround speakers, the second digit [1] refers to the number of subwoofers, and the third digit [4] refers to how many in-ceiling or upward-firing speakers are in the Dolby Atmos® speaker configurations. For example, Dolby Atmos® speaker setups can take on the following configurations: 5.1.2; 5.1.4; 7.1.2; 7.1.4; 9.1.2; and so on.

Figure 2:
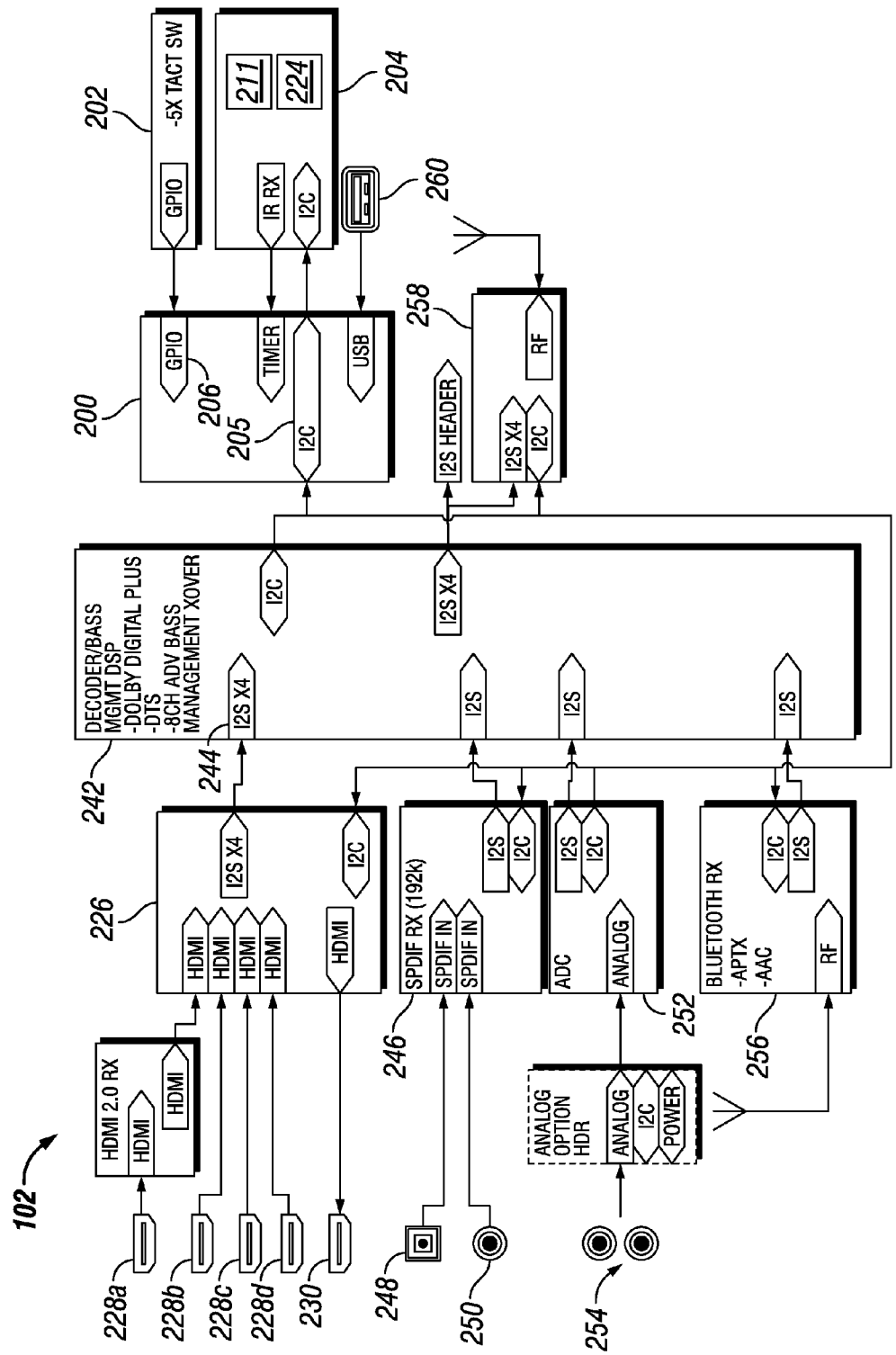
FIG. 2 is a black diagram of a hub 102.

Referring to FIG. 2, the hub 102 includes a controller or control unit 200 that is connected with a button circuit 202 and an indicator or LED circuit 204. In one form, the control unit 200 comprises a microcontroller but those skilled in the art would recognize that other types of control units could be used such as a microprocessor, for example. The control unit 200 provides overall control of the hub 102. The control unit 200 includes an I²C module 205 for allowing the control unit 200 to send and receive commands to various other components of the hub 102. As known in the art, I²C is a multi-master, multi-slave, single-ended, serial computer bus used for attaching lower speed integrated circuits to processors and microcontrollers.

In the preferred form, the button circuit 202 is connected to a general purpose input output port 206 of the control unit 200. The button circuit 202 includes five (5) tact switches or buttons 208a-e (see FIG. 1) that are located on the top panel of the hub 102 that are configured to perform the following functions: switch 208a Power On/Power Off; switch 208b Volume up; switch 208c Volume down; switch 208d Mute; and switch 208e Source Select/Bluetooth® discovery. Pressing any of these switches 208a-e sends a signal to the control unit 200 that causes the control unit 200 to execute code for the given functionality associated with the switch 208a-e. Pressing the power button 208a causes the control unit 200 to turn on or off the hub 102. Pressing the volume up or down buttons 208b, 208c causes the control unit 200 to raise or lower the volume of the wireless speakers 110-122. Pressing the mute button 208d causes the control unit 200 to mute the volume of the wireless speakers 110-122. Pressing the source select button 208e causes the control unit 200 to switch between input sources (HDMI 1, HDMI 2, HDMI 3, HDMI 4, TV, Digital 1 (Coax), Digital 2 (Optical), Analog (RCA), and Bluetooth®).

Figure 3:
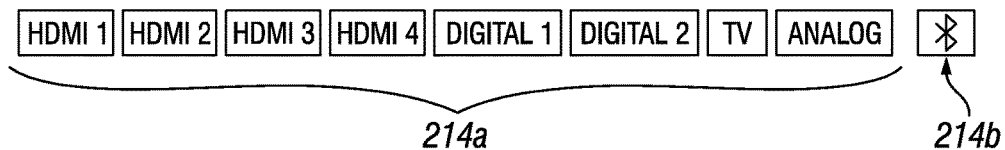
FIG. 3 is an input source display of the hub.

Referring to FIG. 3, the LED circuit 204 includes a plurality of LEDs 211 that are used to illuminate various indicators on a front panel 212 (FIG. 1) of the hub 102. As previously set forth, the LED circuit 204 is connected with and controlled by the control unit 200. The LED circuit 204 is capable of independently illuminating the LEDs 211 to three brightness level settings: full, dim, and off. The control unit 200 is configured to generate a menu option in the OSD to set the brightness level of the LEDs 211.

In one form, the control unit 200 is connected with the LED circuit 204 via an I2C serial bus connection, but other forms of connection are possible and would be known to those skilled in the art. As illustrated in FIG. 3, in one form, the hub 102 includes an input source indicator panel 214a, 214b. An indicator or LED 211 is positioned behind each indicator and is illuminated when that particular source is active or selected by the user as the input source. The input source indicator panel 214a, 214b includes HDMI1-HDMI4 indicators, a Digital 1 indicator, a Digital 2 indicator, a TV indicator, an Analog indicator, and a Bluetooth® indicator.

Figure 4:
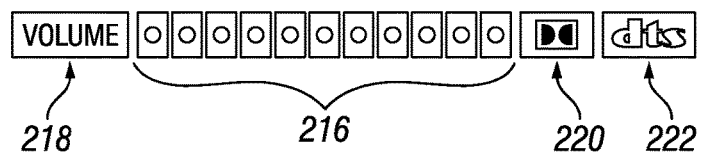
FIG. 4 is a volume display and surround mode display of the hub.

Referring to FIG. 4, in another form, the front panel 212 of the hub 102 includes a volume indicator panel 216. As the user turns up and down the volume of the wireless speakers 110-122, the control unit 200 causes LEDs 211 to illuminate behind the volume indicator panel 216. The control unit 200 is configured to increase the number of LEDs 211 illuminated as the volume increases and decrease the number of LEDs 211 illuminated as the volume decreases. A volume indicator 218 is included to inform the user that the volume indicator panel 216 is associated with the volume level of the wireless speakers 110-122. When there is a volume level that does not land exactly on one of the ten (10) LEDs, the control unit 200 is configured to dim the rightmost LED.

As further illustrated in FIG. 4, a Dolby indicator 220 is included and is illuminated by the control unit 200 by illuminating an LED 211 when the hub 102 is operating using Dolby audio decoding. A DTS indicator 222 is included and is illuminated by the control unit 200 by illuminating an LED 211 when the hub 102 is operating using DTS audio decoding.

Referring to FIG. 2, the LED circuit 204 includes an infrared remote control sensor 224 that is connected with the control unit 200. The infrared remote control sensor 224 is configured to receive signals from the remote control 108 of the hub 102. In one form, the sensor 224 is configured and operable to receive and decode NEC format codes.

The hub 102 also includes an HDMI repeater module 226 that is connected with the control unit 200. In one form, the HDMI repeater module 226 is connected with the control unit 200 using an I2C bus connection, but other forms of connection are possible as known to those skilled in the art. The HDMI repeater 226 includes four HDMI inputs 228a-d and one HDMI output 230. In one form, the first HDMI input 228a comprises an HDMI input port that supports HDCP 2.2, but one or more of the inputs 228a-d could all support HDCP 2.2 in other forms. In another form, HDMI inputs 228a-d and HDMI output 230 support CEC commands and 4 k pass through at 3 GHz/4:2:0 format. The output port 230 also supports Audio Return Channel ("ARC").

Figure 5:
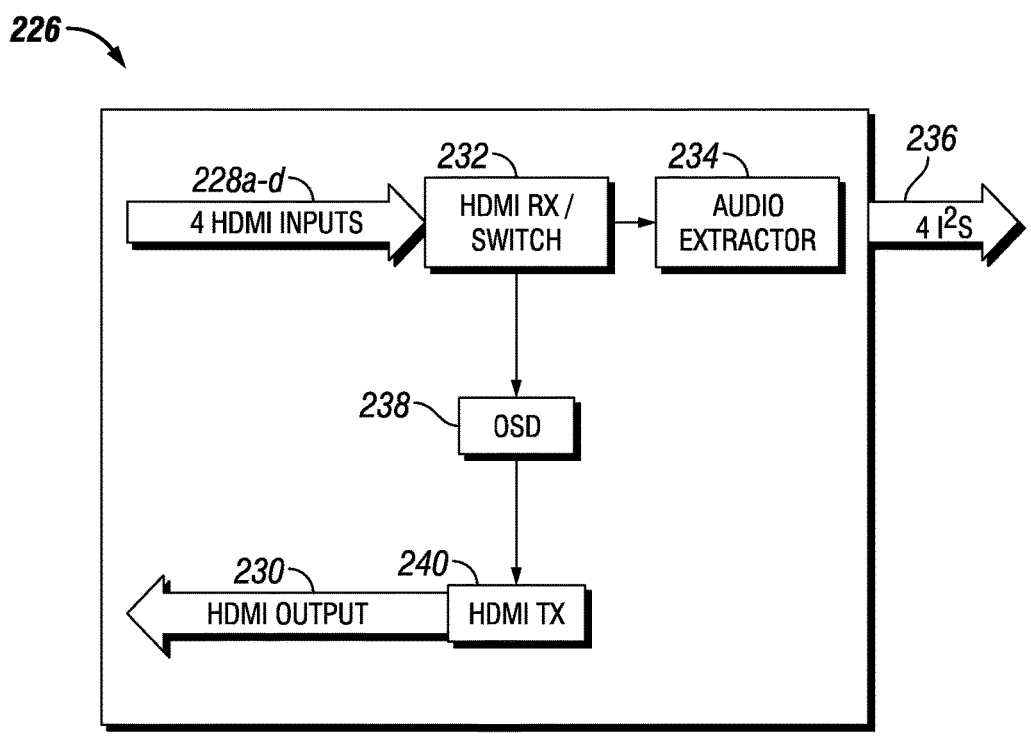
FIG. 5 is block diagram of a HDMI repeater of the hub.

Referring to FIG. 5, a more detailed diagram of the HDMI repeater module 226 is illustrated. The HDMI repeater module 226 is capable of receiving up to four inputs via HDMI inputs 228a-d. As illustrated, the inputs are fed to an HDMI switch 232 that is used to select one of the respective audio and video input signals being supplied from a respective input source 106a, 106b. The switch 232 is controlled by signals from the control unit 200, which determines which respective input source 228a-d is selected. An audio extractor 234 is included that is operable to extract the audio portion of the signal from the signal. The audio portion of the signal is output from the HDMI repeater module 226 for processing on one or more outputs 236. In one form, the audio portion is extracted and output from the HDMI repeater module 226 on four I²S lines.

The HDMI repeater module 226 includes an on screen display ("OSD") module 238. When activated, the OSD module 238 is operable to generate a system configuration menu on the video display device 104. The OSD module 238 is controlled by the control unit 200. In one form, the OSD module 238 is configured to allow the user to setup and configure the wireless speakers 110-122 and other settings of the hub 102. When the OSD is not being used, the selected video signal is passed to the HDMI transmitter 240.

During operation, the user would use the remote control 108 to cause the control unit 200 to generate the system configuration menu on the video display device 104 by pressing, for illustrative purposes only, a settings button on the remote control 108. The user would then use the remote control 108 to select various options and the control unit 200 would receive the user inputs and send appropriate command signals to the HDMI repeater module 226. For example, the user could use the remote control 108 and the OSD to switch video inputs from HDMI 1 to HDMI 2. As set forth in greater detail below, the user also uses the OSD generated by the OSD module 238 to setup and configure the wireless speakers 110-122.

As further illustrated in FIG. 5, the HDMI repeater module 226 also includes an HDMI transmitter module 240. The HDMI transmitter module 240 is operable to transmit the selected video signal to the video display unit 104 (e.g.—video signal from HDMI 1 for instance). As set forth above, the audio/video signal received from one of the respective input sources 106a, 106b has had the audio portion of the signal extracted at this point by the audio extractor module 234. The HDMI transmitter module 240 is operable to pass the video signal received from the respective input source 106a, 106b on to a respective device as an output (e.g.—video display unit 104). The HDMI transmitter module 240 is connected with the HDMI output 230, which is located on the back of the hub 102.

Referring back to FIG. 2, the hub 102 also includes a signal processing module 242 that performs the primary audio functions. The control unit 200 is connected with the signal processing module 242. In addition, the outputs 236 of the HDMI repeater module 226 are connected with the signal processing module 242. As such, the audio signal received from one of the HDMI inputs 228a-d is sent from the HDMI repeater module 226 to the signal processing module 242. In one form, the signal processing module 242 includes four I²S inputs 244 that receive the audio signal from the HDMI repeater module 226.

The signal processing module 242 is configured and operable to decode several audio formats. In particular, in one form, the signal processing module 242 is operable to decode Dolby Pro-Logic llx, Dolby Digital, Dolby Digital Plus, and DTS. In another form, the signal processing module 242 is operable to decode Dolby Pro Logic, Dolby Pro Logic II, Dolby Digital, DTS, DTS Neo:6, Dolby Pro Logic IIx, Dolby Pro Logic IIz, Dolby Digital EX, THX Surround EX, DTS-ES, Dolby Digital Plus, Dolby TrueHD, DTS-HD, DTS-HD Master Audio, and Dolby Atmos.

The signal processing module 242 is configured and operable to crossover each speaker channel at separate crossover frequencies. The high pass audio is passed to each speaker channel. The low pass audio is summed with the low-frequency effects (LFE) channel and routed to the subwoofer channel. The signal processing module 242 is configured and operable to downmix any decoder output into its speaker outputs, route them to any WiSA channel, and add delay as needed. This includes downmixing and routing 96 kHz, 8-channel HDMI inputs. The signal processing module 242 is configured and operable to apply a low shelf filter whose parameters are dependent on the volume setting of the hub 102. Further, the signal processing module 242 is configured and operable to generate pink noise, sine, and chime signals and route those signals to each speaker individually.

The hub 102 also includes an S/PDIF receiver 246 that is connected with the signal processing module 242. The S/PDIF receiver 246 is also connected with the control unit 200. In one form, the S/PDIF receiver 246 is connected with the signal processing module 242 via an I²S serial bus connection and with the control unit 200 via a I²C connection although other ways of connecting the components exist. The S/PDIF receiver 246 includes an optical audio cable/TOSLINK port 248 and a coaxial port 250. In one form, the S/PDIF receiver 246 is connected with the signal processing module 242 via an I²S serial bus connection. The S/PDIF receiver 246 is configured and operable to handle sampling rates up to and including 192 kHz. The control unit 200 is configured and operable to select the S/PDIF receiver 246 as an input source of chosen by the user thereby providing audio from the S/PDIF receiver 246 to the wireless speakers 110-122.

The hub 102 includes an A/D converter 252 that is connected with a pair of audio jacks 254. The audio jacks 254 are configured to deliver analog audio signals to the A/D converter 252 that converts the analog signals into digital audio signals. The A/D converter 252 is connected with the signal processing module 242. In addition, the A/D converter 252 is connected with the control unit 200. In one form, the A/D converter 252 is connected with the signal processing module 242 via an I²S serial bus connection and with the control unit 200 via a I²C connection although other ways of connecting the components exist. The control unit 200 is configured and operable to select the A/D converter 252 as an input source for audio if chosen by the user thereby providing audio received through the audio jacks 254 to the wireless speakers 110-122.

The hub 102 includes a Bluetooth receiver 256 that is connected with the signal processing module 242 and the control unit 200. In one form, the Bluetooth receiver 256 is connected with the signal processing module 242 via an I²S serial bus connection and with the control unit 200 via a I²C connection although other ways of connecting the components exist. The Bluetooth receiver 256 supports the A2DP audio profile and includes AAC and aptX decoders. In addition, the Bluetooth receiver 256 is able to pass AVRCP commands to a A2DP source device. The Bluetooth receiver 256 is also able to receive serial profile data so that the hub 102 can be controlled by a iOS or Android app.

The hub 102 includes a wireless transceiver 258 that is connected with the signal processing module 242 and the control unit 200. In one form, the signal processing module 242 is connected with the wireless transceiver 258 with four I²S serial bus connections and with the control unit 200 with a I²C connection. In one form, the wireless transceiver 258 comprises a WiSA 8-channel audio transceiver that is capable of communicating with the wireless speakers 110-122 at sampling rates up to and including 96 kHz. The wireless transceiver 258 is capable of transmitting audio to the speakers in various audio formats including, but not limited to, Dolby Pro Logic, Dolby Pro Logic II, Dolby Digital, DTS, DTS Neo:6, Dolby Pro Logic IIx, Dolby Pro Logic IIz, Dolby Digital EX, THX Surround EX, DTS-ES, Dolby Digital Plus, Dolby TrueHD, DTS-HD, DTS-HD Master Audio, and Dolby Atmos.

The hub 102 also includes a USB port 260 that is connected with the control unit 200. The USB port 260 is provided for software updates, file playback, and charging an external device. The charge current must be at least 500 mA. The USB port 260 is configured and operable to hose mass storage class devices using all common file systems.

Figure 6:
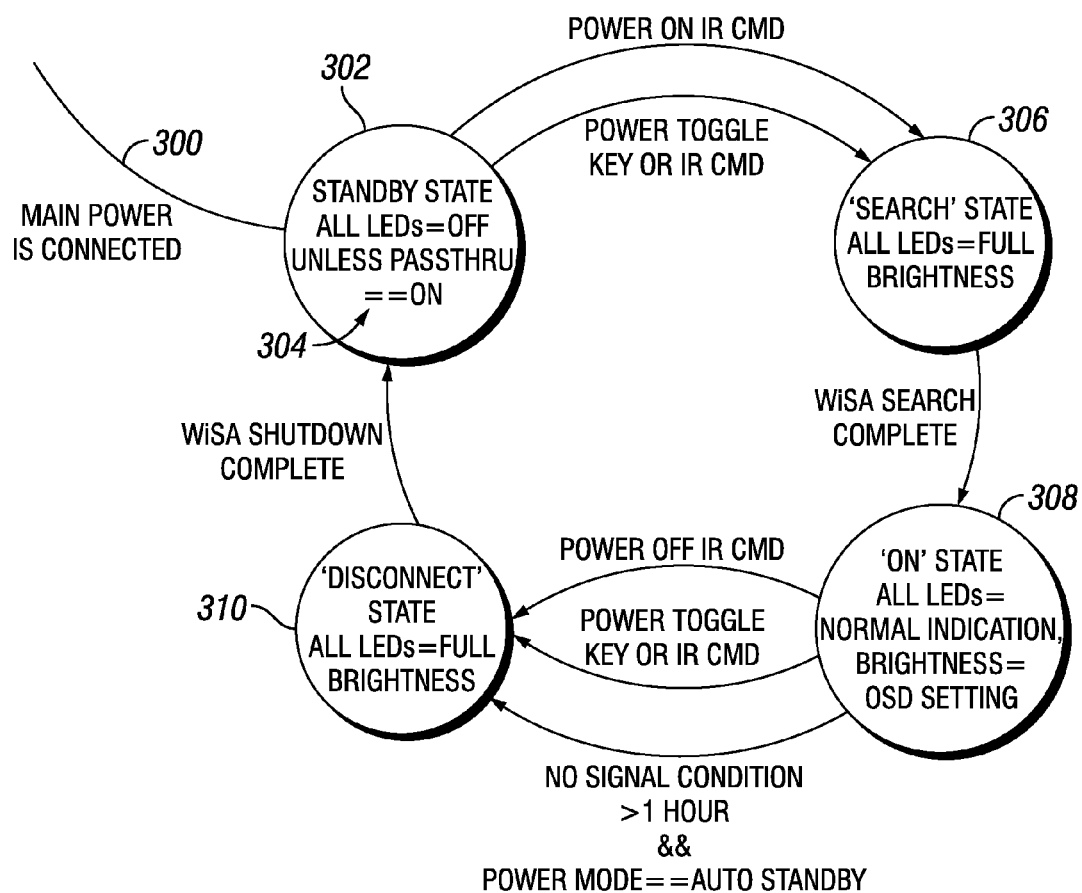
FIG. 6 is a flow chart for functional aspects of the hub.

The control unit 200 on the hub 102 includes software that is capable of performing various functions. Referring to FIG. 6, various states that the hub 102 can operate in are set forth. Once the main power is connected to the hub (300), the control unit 200 places the hub 102 in a standby state 302. The standby state 302 is a lower power state where the hub 102 is connected to power and consumes a minimal amount of power. All LEDs 211 are off in the standby state unless HDMI pass thru is enabled. If HDMI pass thru is enabled, in which the audio and video signal from a respective input source 106a, 106b is simply being passed thru the hub 102, a pass thru HDMI port LED 304 will be lit to indicate that the input is passed through the hub 102 to the HDMI output 230.

When the hub 102 is turned on, by either pressing the power button 208a on the hub 102 or the power button on remote control 108, the control unit 200 is configured to illuminate all LEDs 211 at full brightness until a speaker search is completed by the hub 102, which is represented at 306. Once the speaker search is complete, the control unit 200 is configured to set the LEDs 211 to their operating brightness (full, dim, or off) as set in the user menus and show a current volume level and a current input selection (e.g.—HDMI 1), which is represented at 308.

If the power option in the menus is set to "always on," the hub 102 should never transition to the standby state unless a power command is received by the control unit 200 from the remote control 108 or the power button 208a on the hub 102. Any time the hub 102 is transitioning to the standby state, the control unit 200 is configured to illuminate all LEDs 211 at full brightness until the wireless connection between the hub 102 and the wireless speakers 110-122 is severed which is represented at 310.

Figure 7:
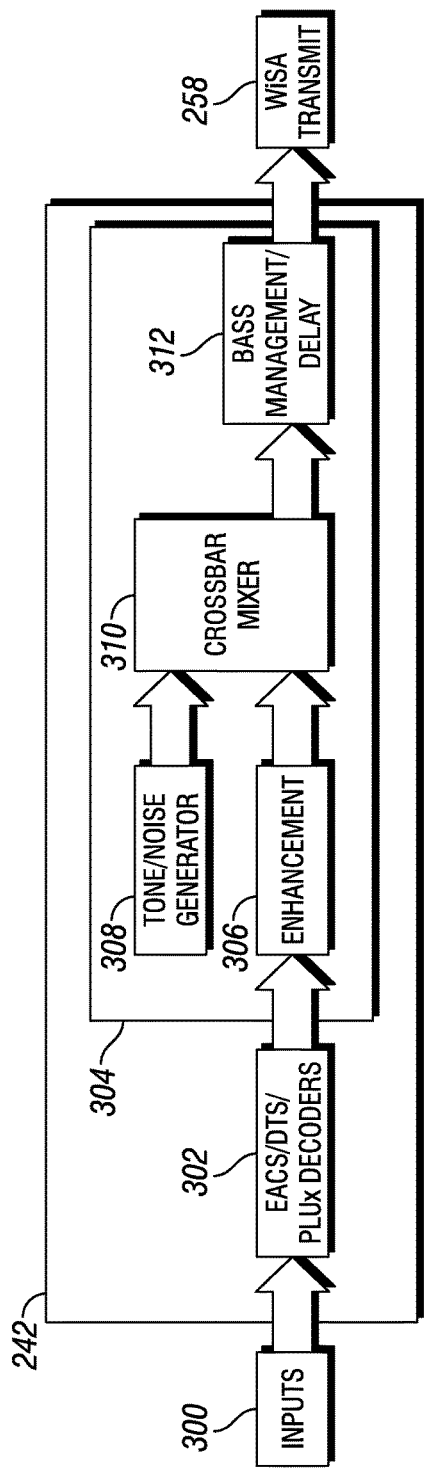
FIG. 7 is a block diagram of components and software code used in the signal processing module of the hub.

Referring to FIG. 7, a more detailed discussion of the signal processing module 242 will be discussed. As previously set forth, the HDMI repeater 226 extracts the audio signal from the audio/video signal received from a respective input source 106a, 106b and sends the audio signal to the signal processing module 242. The audio signal input 300 is processed by a respective decoder 302 that is configured and operable to decode the audio signals (if one is needed). In one form, the decoded audio signal is comprised of eight (8) channels, but any number of channels could be used in other forms. In one form, the signal processing module 242 includes a EAC3 decoder, a DTS decoder, a Dolby Pro-Logic llx decoder, and a DTS Neo6 decoder. In other forms, the signal processing module 242 could include any decoder that is configured and operable to produce surround sound. The user, via the remote control 108, configures the control unit 200 to determine what sound mode is used by the hub 102.

The decoders described above are used to extract the various audio channels from the source media. In most instances, encoding is used to overcome data rate restrictions of a given media. The decoders may also be used to provide encryption or other security functions to protect the content. The decoders can also be used to create additional audio channels in systems where the number of audio output channels is greater than the number of source audio channels.

The signal processing module 242 includes a digital signal processor (DSP) 304. The decoders 302 are connected with and send decoded audio output signals to the DSP 304. The user is able to select the audio mode that the hub 102 operates in. The decoder 302 used to decode the audio input 300 is dependent upon the audio mode that the user selects. The default mode used by the hub 102 is Stereo. In this mode, the left and right channels are passed directly to the left and right speakers with any bass management based on the speakers that are present. All 2-channel inputs directly default to this mode after the hub 102 is reset.

The user is able to select other surround modes that cause the control unit 200 to use different decoders 302 to produce sound on the wireless speakers 110-122. In one form, the user is able to configure the hub 102 to produce audio in direct mode, all-channel stereo mode, PLIIx movie mode, PLIIx music mode, PLIIx game mode, Neo6 Cinema mode, and Neo6 Music mode. In direct mode, the left and right channels are passed directly to the left and right speakers without any bass management. In all-channel stereo mode, the left channel is routed to the left speaker 114, left surround 118, and left surround back channel 122. The right channel is routed to the right speaker 112, right surround 116, and right surround back channel 120. The center speaker 110 receives 0.5 left and 0.5 right.

In PLIIx movie mode, the audio is processed with the Pro-Logic IIx decoder 302 in Movie mode. In PLIIx music mode, the audio is processed with the Pro-Logic IIx decoder 302 in Music mode. In PLIIx game mode, the audio is processed with the Pro-Logic IIx decoder 302 in Game mode. In Neo6 cinema mode, the audio is processed with the Neo6 decoder 302 in Cinema mode. In Neo6 music mode, the audio is processed with the Neo6 decoder 302 in Music mode. Those skilled in the art would recognize that the hub 102 could include numerous decoders and be configured to decode audio in various formats.

All eight audio channels are directed to the DSP 304. The DSP 302 includes an audio enhancement block 306 that includes a low shelf filter that works on all channels. The low shelf filter parameters are set based on a current volume level. The low shelf filter is able to be bypassed using the OSD. In one form, the low shelf filter is executable code functioning on the DSP 304. The audio enhancement block 306 also includes a night mode that reduces the subwoofer level and compresses the dynamics. The night mode can be turned on and off using the OSD. The DSP 304 is configured and operable to include a tone generator 308. The tone generator 308 can produce sine tones from 20 Hz to 20 kHz, pink noise, and a signal chime for speaker identification. The sine tones have seamless frequency transitions. In one form, the tone generator 308 is created using code running on the DSP 304.

After the audio signals are processed by the enhancement block 306, the audio signals are processed by a crossbar mixer module 310 on the DSP 304. The crossbar mixer 310 is operable to route any of the eight (8) input channels to any of the eight (8) output channels. The crossbar mixer module 310 is also capable of routing signals from the tone generator 308 to any of the eight (8) output channels. The crossbar mixer module 310 is capable of performing the following functions:

Downmix the 8 channel decoder block output based on the number of speakers present;
Route the LFE signal to the left and right channels when a subwoofer is not present; and
Send a test tone from the tone generator to each speaker individually, even when they are assigned to the same WiSA slot In one form, the crossbar mixer module 310 is software or code that is executable by the DSP 310.

The hub 102 is configured to always pass audio, no matter what speaker setup is connected. If a non-optimal speaker assignment is made, the control unit 200 will generate an OSD that will warn the user whenever the main menu, startup screen, or status display is displayed. Suboptimal speaker setups include anything other than the setups listed below with or without a subwoofer. This includes multiple speakers assigned to the same channel.

L R (2.x)
L C R (3.x)
L C R sideL sideR (5.x)
L R sideL sideR (5.x with phantom center)
L C R sideL sideR back (6.x)
L R sideL sideR back (6.x with phantom center)
L C R sideL sideR backL backR (7.x)
L R sideL sideR backL backR (7.x with phantom center)

Referring to FIG. 7, the DSP 304 includes a bass management module 312 that consists of software or code in the DSP 304 that receives up to eight (8) audio output signals or channels from the crossbar mixer module 310. The bass management module 312 is configured or programmed such that each channel has an independent crossover filter. As set forth in greater detail below, each channel's crossover frequency and speaker size are set per the parameters received from each individual wireless speaker 110-122 connected to the system 100. If there is more than one wireless speaker 110-122 assigned to a given channel (slot), the hub 102 must retrieve the bass management parameters from every wireless speaker 110-122 on that slot and use the highest reported crossover frequency from one of the respective wireless speakers 110-122. In one form, the crossovers use a $2^{nd}$ order high pass filter with Q=0.707 for each main channel. The corresponding subwoofer low pass filters are $4^{th}$ order low pass filter with Q=0.707. The Q values for the high pass filter and low pass filter could vary in other embodiments.

In the preferred form, the hub 102 is configured to send a back channel command to each speaker 110-124 to query the preferred filters from each speaker 110-124. As set forth in greater detail below, each wireless speaker 110-124 includes one or more filter parameters (filter type, frequency, Q, and so forth) stored in the speakers 110-124. These filter parameters can be transmitted to the hub 102. In one form, the filter parameters comprise biquad filter parameters. For example, for the filter parameters for the main speaker channel can be as follows: Biquad 1: 130 Hz high-pass, Q=0.5; Biquad 2: 130 Hz band-pass EQ, −6 dB, 130 Hz, Q=2.0 and for the subwoofer channel can be as follows: Biquad 1: 130 Hz low-pass, Q=0.707; Biquad 2: 130 Hz low-pass, Q=0.707. In the preferred form, the speakers 110-124 comprise wireless speakers, but the bass management module 312 could be utilized in systems 100 with wired speakers as well. As such, communication of the filter parameters from the speakers 110-124 to the hub 102 could occur using a wired medium or a wireless medium. In other forms, the filter parameters associated with each speaker 110-124 could be transmitted to the hub 102 using Bluetooth, WiFi, or NFC.

Referring to FIGS. 2 and 7, the hub 102 includes a wireless transceiver 258 that is connected with the control unit 200 and the signal processing module 242. The wireless transceiver 258 is configured and operable to communicate with the wireless speakers 110-124. As such, the transceiver 258 is able to send data to and receive data from the wireless speakers 110-124. In one form, the hub 102 communicates with the speakers 110-124 using a (U-NII) 5 GHz radio band and uses dynamic frequency selection (DFS). DFS is a mechanism to allow unlicensed devices to use the 5 GHz frequency bands already allocated to radar systems without causing interference to those radars. The transceiver 258 is configured to detect the presence of a radar system on a channel and, if the level of the radar is above a certain threshold, vacate that channel and select an alternate channel. In one form, the transceiver 258 comprises a WiSA compliant transceiver. In other forms, any radio frequency band can be used by the hub 102 to communicate with the speakers 110-124.

The transceiver 258 is operable to communicate with the speakers 110-124 using 24-bit uncompressed audio. In addition, the hub 102 is configured to have a sample rate that matches the content: 32, 44.1, 48, and 96 k samples/second. The base management module 312 of the DSP 304 is configured to introduce a 5.1 ms fixed latency delay that provides optimal lip synch and game response. Further, the hub 102 is operable to have a speaker-to-speaker delay of +/−1 μs.

Figure 8:
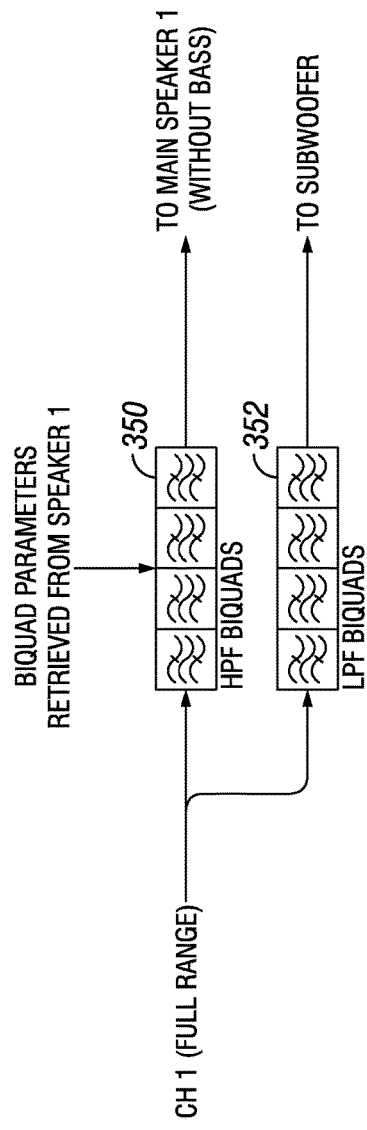
FIG. 8 is an illustrative channel filter used by the DSP of the hub.

Referring to FIG. 8, a representation of how one (channel 1) of the seven audio channels is filtered by the base management module 312 is illustrated. As illustrated, the first audio channel is output from the crossbar mixer 310 to the base management module 312 having a full audio range. The full range audio signal is then processed by a first biquad filter 350 and a second biquad filter 352 configured as digital filters in the DSP 304 of the hub 102. In one form, the first biquad filter 350 comprises two biquad filters and the second biquad filter 352 comprises two biquad filters. The first biquad filter 350 comprises a high-pass filter that is configured to remove low frequency components (bass) from the full range audio signal. The second biquad filter 352 comprises a low pass filter that is configured to remove high frequency components from the full range audio signal.

In one form, the first and second biquad filters 350, 352 are configured and implemented as a function of the filter parameters associated with each respective speaker 110-124. As previously set forth, the hub 102 is configured to receive the filter parameters from each individual speaker 110-124 thereby knowing what optimal settings to operate and provide audio signals to the speaker 111-124. In one form, the first and second biquad filters 350, 352 comprise two biquad filters. In one form, the DSP 304 of the hub 102 is configured to implement digital filters on each channel in the form of infinite impulse response (IIR) filters. In another form, the DSP 304 of the hub 102 is configured to implement digital filters on each channel in the form of finite impulse response (FIR) filters.

Figure 9:
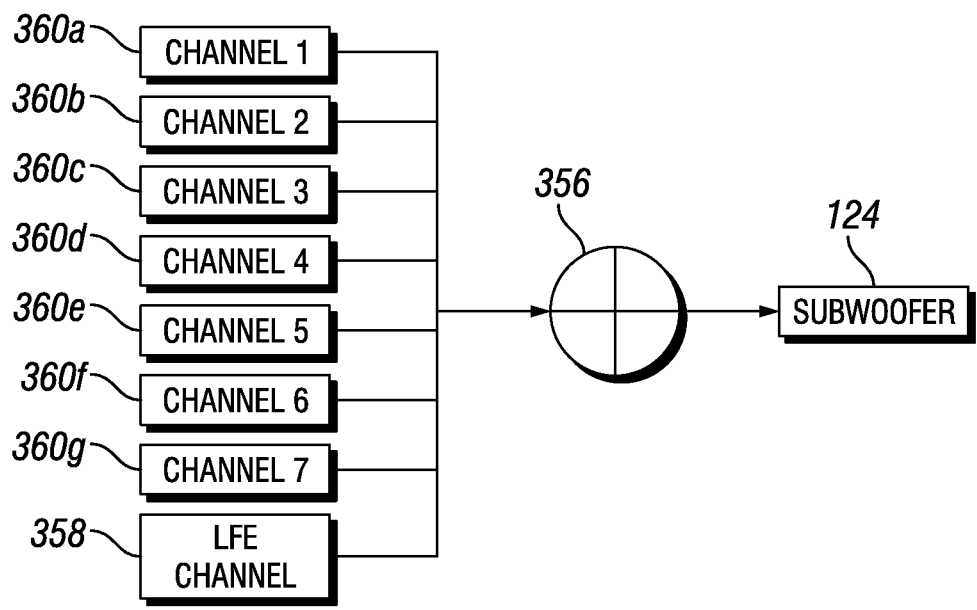
FIG. 9 illustrates how the filter set forth in FIG. 8 includes outputs that are summed together with other channels and the resulting audio output signal is sent to the subwoofer.

The purpose of the first and second biquad filters 350, 352 is to low-pass filter each main channel and add the low passed signal to the subwoofer channel. Referring collectively to FIGS. 8 and 9, in a 7.1 surround sound system, seven audio channels 360a-g are decoded and contain audio signals that are processed by the bass management module 312. In the case of a 7.1 surround sound system, the bass management module 312 will include seven different first and second biquad filters 352, 354 that are each optimally configured using the filter parameters that are associated with each respective main speaker 110-122. In another form, the filter parameters can be transmitted to the hub 102 over a wired connection. As such, each individual channel 360a-g is processed by first and second biquad filters 352, 354 and the output of the second biquad filters 352 are added to the subwoofer channel by a summation module or routine 356. In addition, a low frequency effects (LFE) channel 358 may also be added to the low frequency outputs of the second biquad filters 352. The resulting output from the summation module 356 is then wirelessly transmitted by the transceiver 258 to the subwoofer 124.

Referring back to FIG. 2, the HDMI repeater 226 is a pass-through device for video signals. The HDMI repeater 226 performs no processing to the video signal aside from being configured and operable to generate the OSD. In one form, the HDMI repeater 226 is configured to default to a resolution of 1080p when a valid input signal is not present or when a non-HDMI source is selected on the hub 102. The HDMI repeater 226 is configured to generate an OSD option that allows video pass-through when the hub 102 is in standby mode. If this option is enabled, the last video input used (e.g.—HDMI 1 228a) is passed from that input to the HDMI output 230. When a non-video source is selected (optical 248, coax 250, etc.) the output on the HDMI output 230 will cause a blank screen to appear on the display 104.

The hub 102 includes a universal serial bus (USB) port 260 that is connected with the control unit 200. The control unit 200 is configured to recognize various types of file systems including, but not limited to, FAT16 and FAT32 file systems. In one form, the control unit 200 is configured to update the firmware of the hub 102. In other forms, the firmware of the hub 102 can be updated wirelessly through the transceiver 258.

The control unit 200 is operable to playback audio files from a USB mass storage device that is connected with the USB port 260. In this mode, the control unit 200 will receive the audio files and transmit them to the signal processing module 242. When a USB device with compatible files is connected, the control unit 200 is configured to automatically change the input to USB and start playing the first file. The control unit 200 is configured to generate an OSD that allows the user to use the remote control 108 to control how the audio files are played by the hub 102.

The control unit 200 is configured such that the Bluetooth receiver 256 is available for connection with previously paired devices whenever the hub 102 is in the "on" state. The control unit 200 is configured to operate in Bluetooth mode for one minute after one of the following events:

The 'SOURCE' button on the hub 120 is pressed and held for more than 3 seconds and less than 5 seconds.
A "Bluetooth discoverable mode" IR command is received from the remote control 108.
The "input=Bluetooth" IR command is held for at least 3 seconds and less than 5 seconds.

After any successful connect or pairing process, the control unit 200 is configured to change to the Bluetooth input and generate an OSD that allows the user to control the audio being played.

Referring collectively to FIGS. 10a-10d, circuit diagrams are illustrated for the center channel speaker 110, the floor standing speakers 112, 114, the surround speakers 116, 118, 120, 122, and the subwoofer 124. In this form, the center channel speaker 110 includes five (5) individual drivers, the floor standing speakers 112, 114 includes five (5) individual drivers, and the surround speakers 116, 118, 120, 122 include two (2) individual drivers, but in other forms different numbers of drivers can be utilized. As can be seen, each circuit diagram for each speaker is generally the same. As such, for the sake of clarity, each of the circuit diagrams will be discussed below together with only the differences being pointed out.

As illustrated, the speakers 110-124 each include a control unit 400 that is connected with a wireless transceiver 402 and a DSP 404. In one form, the control unit 400 is connected with the wireless transceiver 402 and the DSP 404 using a I$^2$C connection, but other ways of connecting the components together would be known to those skilled in the art. An output of the wireless transceiver 402 is connected with the DSP 404. The control unit 400 includes internal data storage for storing certain parameters, such as the unique filter parameters associated with each speaker 110-124. In other forms, the DSP 404 can include internal storage for storing certain parameters, such as the unique filter parameters associated with each speaker 110-124. The wireless transceiver 402 includes an antenna 403. The control unit 400 is operable to allow the wireless transceiver 402 to send data to the hub 102 and receive data from the hub 102. In one form, the wireless transceivers 402 are operable to wirelessly receive audio content associated with each respective speaker 110-124 from the hub 102.

Figure 10A:
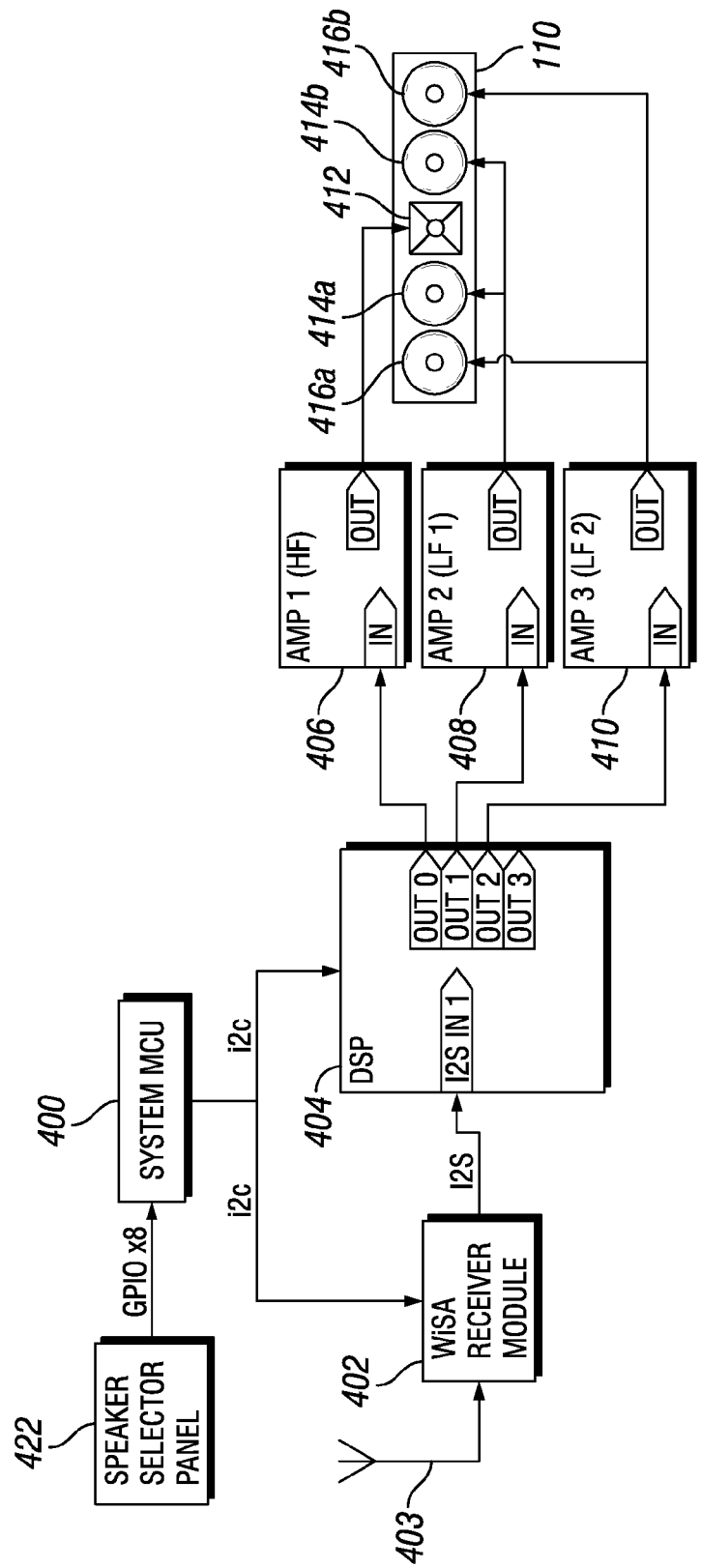
FIG. 10a is a circuit diagram for a representative center channel speaker.
Figure 10B:
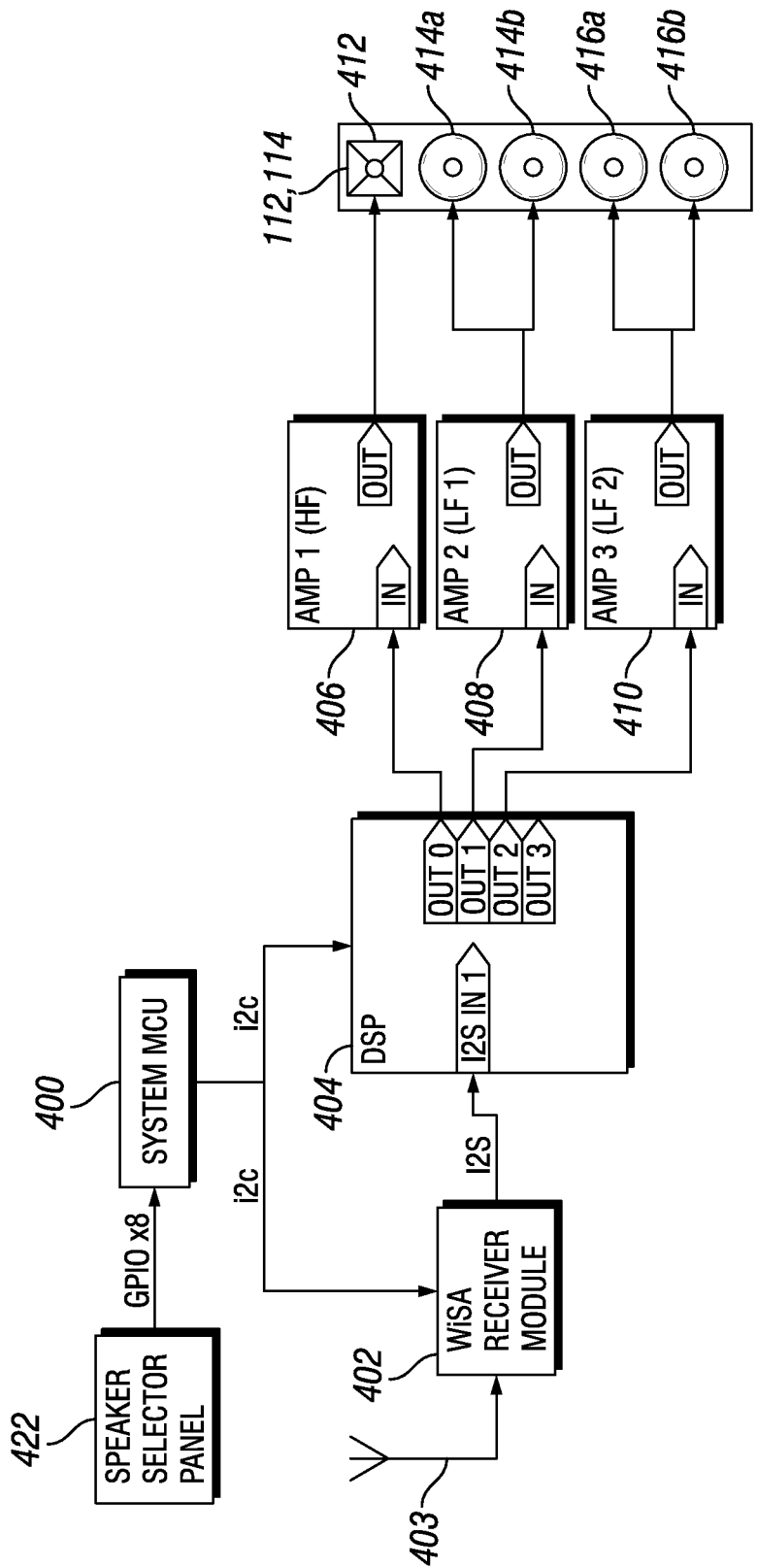
FIG. 10b is a circuit diagram for a representative front channel speaker.

Referring to FIGS. 10a and 10b, the center channel speaker 110 and floor standing speakers 112, 114 each include a first amplifier 406, a second amplifier 408, and a third amplifier 410. The amplifiers 406-410 are connected with outputs from the DSP 404. In one form, the DSP 404 is configured to include speaker crossover filters that divide the audio input received from the wireless transceiver 402 into three audio bands, which include a high frequency band, a first low frequency band and a second low frequency band. As illustrated, the high frequency band is directed to the first amplifier 406, the first low frequency band is directed to the second amplifier 408, and the second low frequency band is directed to the third amplifier 410. The output of the first amplifier 406 is connected to a tweeter 412 of the speakers

110, 112, 114. The output of the second amplifier 408 is connected to a first pair of drivers 414a, 414b and the output of the third amplifier 410 is connected to a second pair of drivers 416a, 416b.

Referring to FIG. 10c, the surround speakers 116, 118, 120, 122 include first and second amplifiers 406, 408 that are connected to outputs from the DSP 404. In this form, the output from the first amplifier 406 is connected to a tweeter 412 of the speakers 116, 118, 120, 122. The output of the second amplifier 408 is connected to a driver 418. In this form, the DSP 404 is configured with crossover filters that divide the audio signal received from the wireless transceiver 402 into two audio bands, which include a high frequency band and a low frequency band. The high frequency band is directed to the first amplifier 406 and the low frequency band is directed to the second amplifier 408.

Referring to FIG. 10d, the subwoofer 124 includes a first amplifier 406 that is connected with an output of the DSP 404. The first amplifier 406 is connected with a subwoofer driver 420 of the subwoofer 124. As set forth above, the audio signal that the subwoofer 124 receives from the hub 102 comprises the sum of the low frequency components from all of the channels 360a-g and the low frequency effects channel 358. In this form, the DSP 404 of the subwoofer 124 receives the audio signal from the wireless transceiver 402 and directs it to the first amplifier 406. The amplifiers discloses herein must support audio sampling rates up to 96 kHz.

Figure 11:
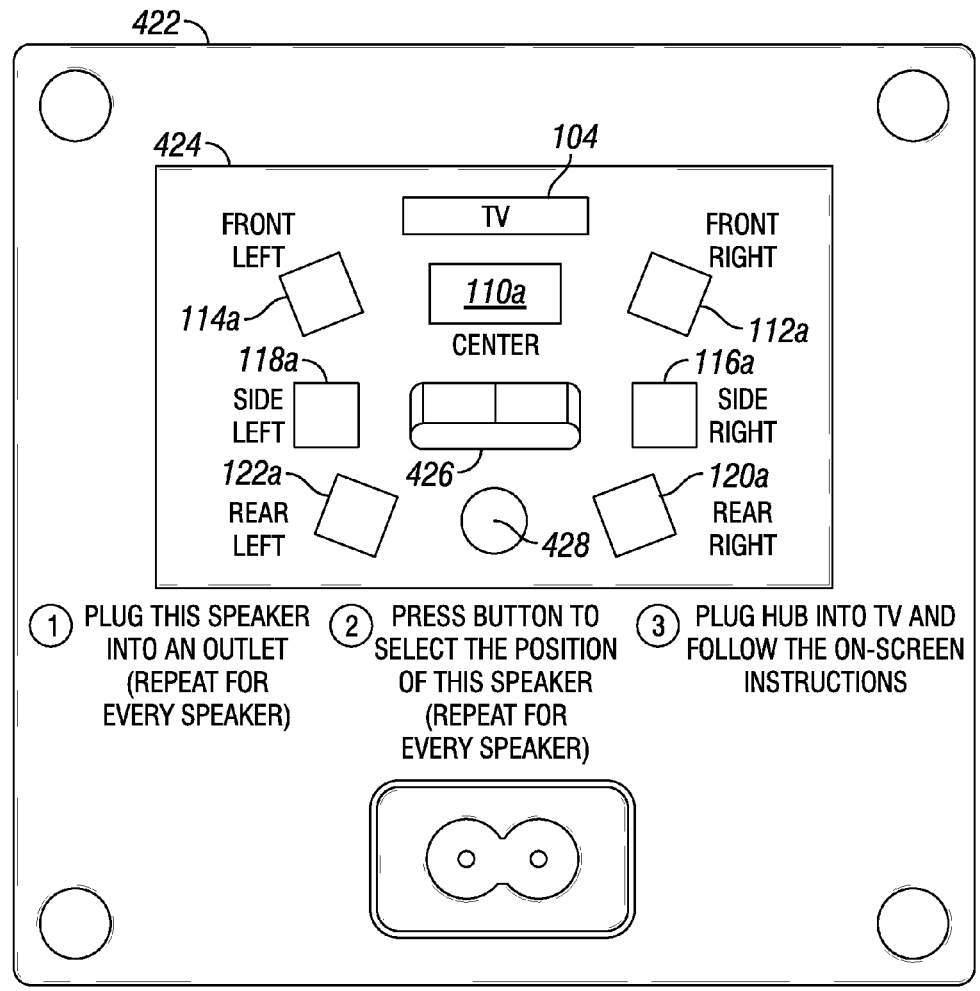
FIG. 11 is a representative speaker selector module of the speakers.

Referring collectively to FIGS. 10a-c and 11, all of the speakers 110-122 except for the subwoofer 124 include a speaker selector module or panel 422 connected with the control unit 400. As illustrated in FIG. 11, in one form, a portion of the speaker selector module 422 is located on the back of the speakers 110-122. The speaker selector module 422 includes a display 424 that illustrates how a 7.1 surround system might be oriented in a room. In this form, a graphic representation of a center speaker 110, front right speaker 112, front left speaker 114, side right speaker 116, side left speaker 118, rear right speaker 120, and rear left speaker 122 is illustrated. In addition, the position of a television or display 104 is illustrated as well as a couch 426.

In the display 424, the speakers 110-122 have an indicator or LED associated with each position or slot. As such, the speaker position indicators 110a-122a are connected with the control unit 400 and the control unit 400 is operable to selectively energize each speaker position indicator 110-122 as a function of the slot the speaker is placed in by the user. The display 424 includes a button 428 that is connected with the control unit 400. In one form, the button 428 comprises a tact switch. Although the display 424 is illustrated as using indicators 110-122, it should be appreciated that in other forms the speaker selector module 422 could comprise a touch screen display device that allows the user to place the speaker in a respective slot.

During setup of the system 100, a user will position the speakers 110-122 in their desired locations in the room. Once in position and power is supplied to the speakers 110-122, the user will press the button 428 on the speaker selector module 422 to set the speaker to a slot (e.g.—center, front right, front left, side right, side left, rear right, or rear left) associated with its respective position or location in the room. In this form, each time the user presses the button 428, the control unit 400 is configured to scroll to the next slot and light up the speaker position LED 110a-122a associated with that respective slot. When the correct slot is selected, the control unit 400 is operable to configure the speaker 110-122 to function in that respective slot. So, for example, if the center slot is selected by the user, the control unit 400 will configure the speaker 110 to function as a center channel speaker and will pair with the hub 102 as a center channel speaker 110. As used herein, the term slot should be construed to mean a channel that the speaker is assigned to such as the center, front right, front left, side right, side left, rear right, rear left, or subwoofer.

Figure 12:
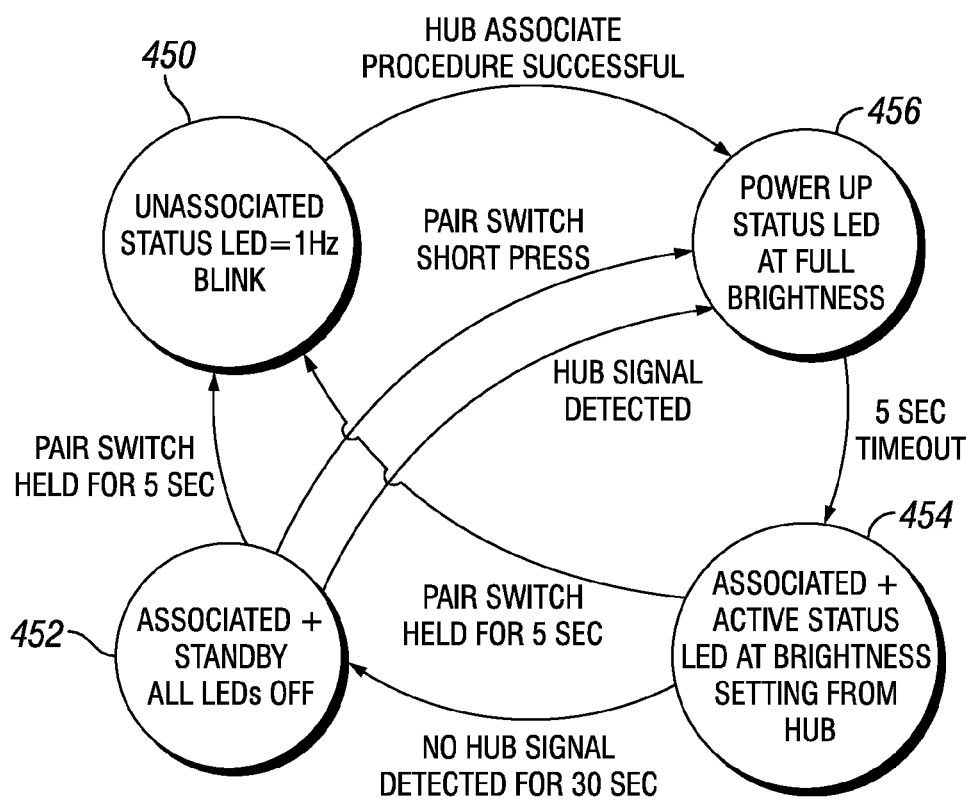
FIG. 12 is a chart depicting the various states in which the speakers can function.

Referring to FIG. 12, the speakers 110-124 are configured to function in three modes or states, which are unassociated 450, associated+standby 452, and associated+active 454. The speakers 110-124 also have a power up state 456. The unassociated state 450 is when a speaker 110-124 is not paired with a hub 102. This is the state that a speaker 110-124 should be in when it is new from the factory. It indicates that the speaker 110-124 is ready to be paired with a hub 102. If the speaker 110-122 has a speaker selector module 422, the LED indicating the currently selected slot will be blinking. Pressing the tact switch 428 will scroll to the next slot.

The associated+standby state 452 is when the speaker 110-124 has been associated with a hub 102 but is in low-power standby mode. This state is reached when the signal from the hub 102 is not detected for a predetermined period of time (e.g.—30 seconds). In this state, all of the speaker location LEDs 110a-122a are off. If the button 428 is pressed briefly, the control unit 400 is configured to place the speaker 110-122 in the associated+active state. If the hub 102 signal remains missing for 30 seconds, the speaker will return to a standby state. If the button 428 is pressed and held for a predetermined period of time (e.g.—5 seconds), the control unit 400 is configured to transition the speaker to the unassociated state where it will delete its association with the hub 102. The associated+active state 454 is when the speaker 110-124 detects a signal from the hub 102 it is paired with and is fully powered on.

When the speaker 110-122 is in the unassociated state 450, short presses of the button 428 will scroll through slots and indicate that selection on the speaker position LEDs 110a-122a. When the speaker 110-122 is in the associated+standby state, the speaker position cannot be changed. Pressing the button 428 will wake the speaker up but will not change its position. Slot changes while in the associated+active state are only valid when the speaker 110-122 is connected to a hub 102. A short press of the button 428 will scroll through the slots. When the user stops pressing the button for a predetermined period of time (e.g. 5 seconds), the control unit 400 is configured to transmit a slot request to the hub 102.

Figure 13:
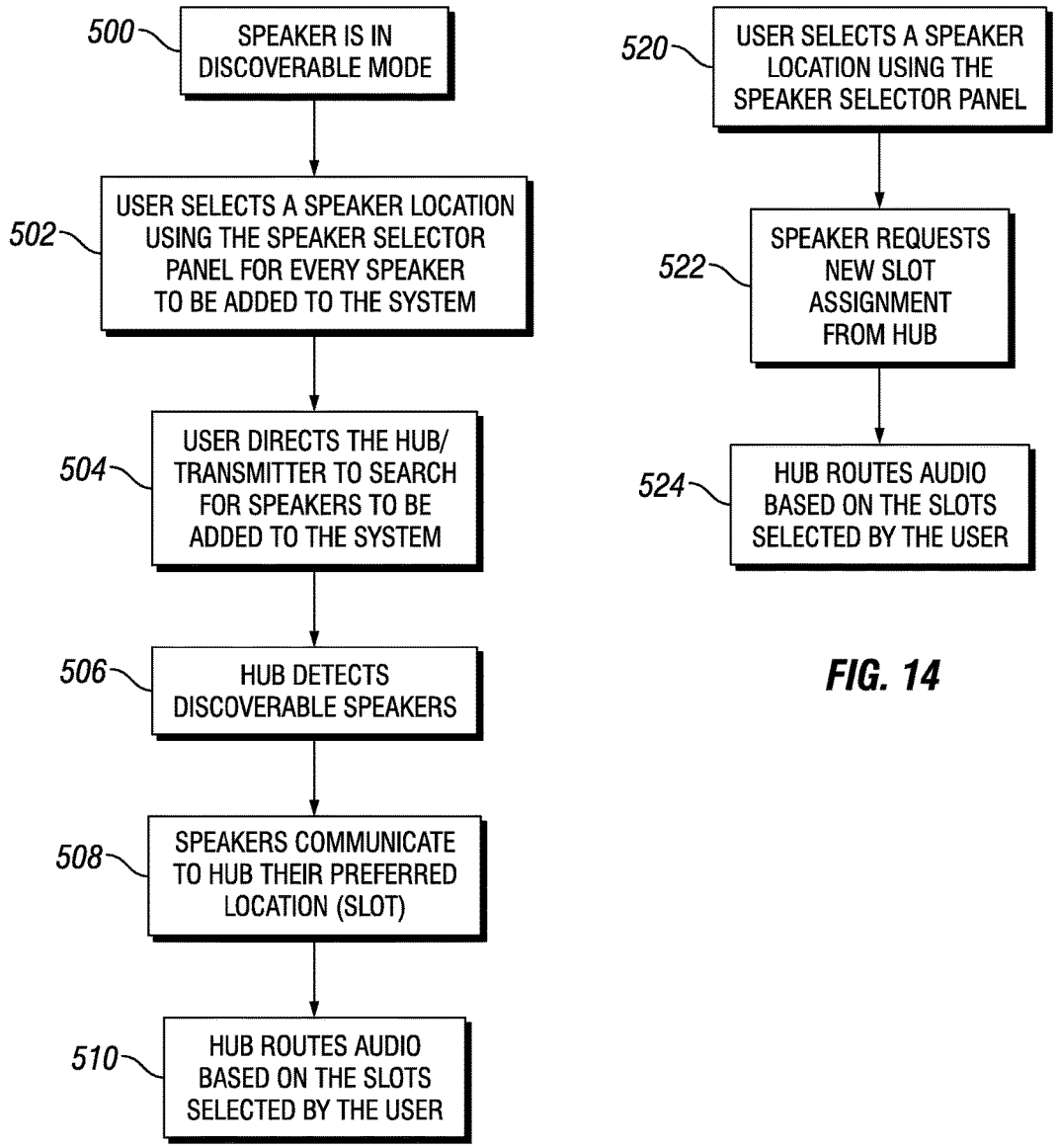
FIG. 13 is a flow chart showing setup of a new system.

Referring to FIGS. 1 and 13, setup of a new system 100 disclosed by the present invention will be discussed. At step 500, the wireless speakers 110-124 are in a discoverable mode and the unassociated state. At step 502, the user selects a respective speaker location using the speaker selector module 422. In particular, the user uses the panel to select the speaker location for every speaker 110-122 to be added to the system 100. The subwoofer 124 would not include a speaker selector module 422 because it will always function as a subwoofer in the system 100. Next, at step 504, the user would use the OSD generated by the hub 102 to direct the hub 102, using the wireless transceiver 258, to search for speakers 110-124 to be added to the system 100.

At step 506, the hub 102 detects the speakers 110-124 that are discoverable in the system 100. At step 508, the speakers 110-124 communicate certain information to the hub 102 so that the hub 102 can pair with the speakers 110-124. In particular, the speakers 110-124 would transmit their selected slot assignments to the hub 102 together with other parameters, such as the filter parameters previously discussed. Finally, at step 510, the hub 102 is operable to route audio to the speakers 110-124 as a function of the slots selected by the user. It should be noted that more than one speaker can be assigned to any given slot. So, for example, two center channel speakers 110 could be assigned to the center channel slot.

Figure 14:
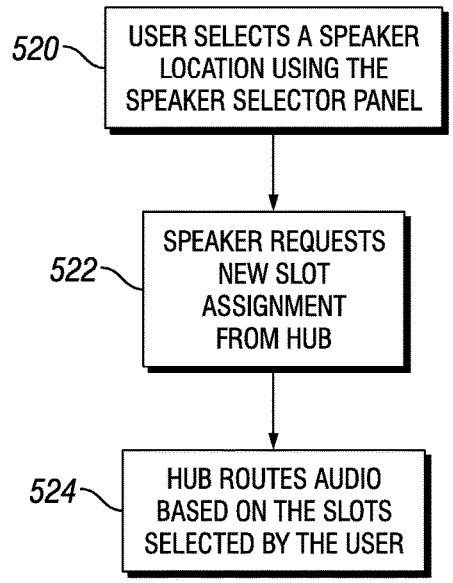
FIG. 14 is a flow chart showing moving speakers in an existing system setup.

Referring to FIG. 14, the hub 102 is also configured to allow the user to move speakers 110-122 to different slots. In this case, the user would select a speaker location using the speaker selector module 422, which is represented at step 520. Next, at step 522, the speaker 110-122 requests a new slot assignment from the hub 102. The hub 102 is configured to assign the speaker 110-122 to the requested slot. At step 524, the hub 102 is then configured to route audio to the speaker 110-122 based on the slots selected by the user.

While the use of words such as preferable, preferably, preferred or more preferred utilized in the description indicate that the feature so described may be more desirable, such feature(s) may not be necessary. Embodiments lacking the same are within the scope of the invention as defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

We claim:

1. A system, comprising:
   a hub configured to be connected with one or more audio sources;
   a plurality of wireless speakers each having one or more filter parameters stored internally that are specific to each said speaker, wherein each said speaker is operable to wirelessly transmit said one or more filter parameters to said hub, and wherein said hub is operable to use said one or more filter parameters transmitted\from\each said\speaker to filter an audio channel slot associated with each said speaker and an associated subwoofer channel; and
   wherein each said speaker includes a speaker selector module, wherein said speaker selector module is configured to allow a user to select one of a plurality of audio channel slots to place each said speaker in based on a position of each said speaker, wherein said hub is configured to wirelessly transmit audio signals to each said speaker based on said audio channel slot selected by said user.

2. The system of claim 1, wherein each said speaker includes at least one amplifier.

3. The system of claim 1, wherein said hub has at least two filters for processing audio signals for each said speaker and at least two filters for processing a subwoofer audio signal for a subwoofer audio channel slot.

4. The system of claim 1, wherein said hub implements said one or more filter parameters as one or more crossover filters.

5. The system of claim 4, wherein said one or more crossover filters are implemented as finite impulse response (FIR) filters.

6. The system of claim 4, wherein said one or more crossover filters are implemented as infinite impulse response (IIR) filters.

7. The system of claim 1, wherein the filter parameters are transmitted to the hub using a Bluetooth connection.

8. The system of claim 1, wherein the filter parameters are transmitted to the hub using a WiFi connection.

9. The system of claim 1, wherein the filter parameters are transmitted to the hub using a near field communication (NFC) connection.

10. The system of claim 1, wherein separate filter parameters are stored for multiple sampling rates.

11. The system of claim 1, wherein said hub is operable to be connected with a display device.

12. The system of claim 1, wherein said hub includes a digital signal processor, wherein a full range audio signal is processed by a first biquad filter and a second biquad filter associated with said digital signal processor as a function of said one or more filter parameters transmitted to said hub by each said speaker.

13. The system of claim 12, wherein said first biquad filter comprises a high pass filter and said second biquad filter comprises a low pass filter.

14. The system of claim 1, wherein said hub includes a digital signal processor that is configured with one or more digital filters that are configured as a function of said one or more filter parameters transmitted to said hub by each said speaker.

* * * * *

UNITED STATES PATENT AND TRADEMARK OFFICE
CERTIFICATE OF CORRECTION

PATENT NO.        : 10,318,097 B2
APPLICATION NO.   : 15/272659
DATED             : June 11, 2019
INVENTOR(S)       : Matthew S. Spitznagle et al.

Page 1 of 1

It is certified that error appears in the above-identified patent and that said Letters Patent is hereby corrected as shown below:

In the Claims

Column 15, Line 39, Claim 1 "transmitted\from\each said\speaker" should read --transmitted from each said speaker--

Signed and Sealed this
Twenty-seventh Day of August, 2019

Andrei Iancu
*Director of the United States Patent and Trademark Office*